United States Patent
You

(10) Patent No.: US 12,309,841 B2
(45) Date of Patent: May 20, 2025

(54) METHOD FOR RANDOM ACCESS AND COMMUNICATION DEVICE

(71) Applicant: GUANGDONG OPPO MOBILE TELECOMMUNICATIONS CORP., LTD., Guangdong (CN)

(72) Inventor: Xin You, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 353 days.

(21) Appl. No.: 17/562,394

(22) Filed: Dec. 27, 2021

(65) Prior Publication Data

US 2022/0124824 A1 Apr. 21, 2022

Related U.S. Application Data

(63) Continuation of application No. PCT/CN2019/099141, filed on Aug. 2, 2019.

(51) Int. Cl.
  *H04W 74/0833* (2024.01)
  *H04B 7/185* (2006.01)

(52) U.S. Cl.
  CPC .... *H04W 74/0833* (2013.01); *H04B 7/18513* (2013.01)

(58) Field of Classification Search
  CPC ......... H04W 74/0833; H04W 56/0045; H04W 74/008; H04W 74/006; H04B 7/18513; H04B 7/1851; H04B 7/1853
  See application file for complete search history.

(56) References Cited

U.S. PATENT DOCUMENTS

| 10,172,162 | B2 | 1/2019 | Yi et al. | |
| 2008/0273610 | A1* | 11/2008 | Malladi | H04L 1/0061 375/260 |
| 2015/0049753 | A1* | 2/2015 | Park | H04J 11/005 370/350 |

(Continued)

FOREIGN PATENT DOCUMENTS

| CN | 102647783 | 8/2012 |
| CN | 102711273 | 10/2012 |

(Continued)

OTHER PUBLICATIONS

ZTE Corporation et al., "Consideration of Random Access for NTN", 3GPP TSG RAN WG2 Meeting #105bis, Apr. 12, 2019, R2-1903391, 8 pages.

(Continued)

*Primary Examiner* — Andrew C Oh
(74) *Attorney, Agent, or Firm* — Hodgson Russ LLP

(57) ABSTRACT

A method for random access and a communication device are provided. The method includes the following. A time window used by a terminal device for reception of a downlink (DL) message during random access is determined according to first information and/or second information. The second information represents a distance between the terminal device and a network device. The first information includes an adjustment parameter, the adjustment parameter is used for adjusting a nominal value of a time parameter of the time window, and the time parameter includes a duration and/or an offset of the time window.

16 Claims, 4 Drawing Sheets

(56) References Cited

U.S. PATENT DOCUMENTS

| | | | |
|---|---|---|---|
| 2017/0135132 A1* | 5/2017 | Selvaganapathy | ............................ H04W 56/0005 |
| 2020/0413451 A1* | 12/2020 | Taherzadeh Boroujeni | ................ H04W 56/005 |
| 2022/0007431 A1* | 1/2022 | Qiu | ....................... H04B 7/1851 |
| 2022/0132586 A1* | 4/2022 | Zhang | ............... H04W 74/0833 |

FOREIGN PATENT DOCUMENTS

| | | |
|---|---|---|
| CN | 107623649 | 1/2018 |
| WO | 2018228566 | 12/2018 |
| WO | 2019119411 | 6/2019 |

OTHER PUBLICATIONS

EPO, Extended European Search Report for EP Application No. 19940494.8, May 2, 2022.

Samsung, "Considerations on random access for NTN," 3GPP TSG RAN WG1 Meeting #93, R1-1806750, May 2018.

Nokia et al., "Impacts of long RTTs to Random Access Response," 3GPP TSG-RAN WG2 Meeting #106, R2-1907069 (revision of R2-1904030), May 2019.

CNIPA, First Office Action for CN Application No. 201980095045. 2, Aug. 18, 2023.

Oppo, "Discussion on RACH procedure for NTN", 3GPP TSG-RAN WG2 Meeting #106, R2-1905581, May 2019.

Nokia et al., "Considerations on Timing Advance and Random Access for NTN", 3GPP TSG RAN WG1 Meeting #93, R1-1806768, May 2018.

WIPO, International Search Report for International Application No. PCT/CN2019/099141, Apr. 22, 2020.

Zte Corporation et al., "Consideration on Random Access for NTN," 3GPP TSG-RAN WG2 #105 Meeting, R2-1900576, Feb. 2019.

EPO, Communication for EP Application No. 19940494.8, Mar. 6, 2024.

* cited by examiner

METHOD FOR RANDOM ACCESS AND COMMUNICATION DEVICE

CROSS REFERENCE TO RELATED APPLICATION(S)

This application is a continuation of International Application No. PCT/CN2019/099141, filed on Aug. 2, 2019, the entire disclosure of which is incorporated herein by reference.

TECHNICAL FIELD

This disclosure relates to the field of communication, and more particularly to a method for random access and a communication device.

BACKGROUND

In a cellular network, when initiating random access, after transmitting a first message (Msg 1), a terminal device will monitor a random access-radio network temporary identifier (RA-RNTI) scrambled physical downlink control channel (PDCCH) in a random access response (RAR) window, to receive a corresponding RAR message. If no RAR message is received by the terminal device in the RAR window, the terminal device considers that the random access fails, and the terminal device can retransmit the Msg 1.

For non-terrestrial network (NTN) technology, since it uses satellite communication to provide communication services to terrestrial users, signal propagation delay between the terminal device and a satellite increases substantially. In addition, since locations of terminal devices are different, signal propagation delay between different terminal devices and the satellite is also quite different, and the above RAR window is no longer applicable. Therefore, in an NTN system, how the terminal device can achieve efficient random access has become a problem to be solved.

SUMMARY

In a first aspect, a method for random access is provided. The method includes the following. A time window used by a terminal device for reception of a downlink (DL) message during random access is determined according to first information and/or second information. The second information represents a distance between the terminal device and a network device. The first information includes an adjustment parameter, the adjustment parameter is used for adjusting a nominal value of a time parameter of the time window, and the time parameter includes a duration and/or an offset of the time window.

In a second aspect, a communication device is provided. The communication device includes a processor and a memory. The memory is configured to store computer programs. The processor is configured to invoke and execute the computer programs stored in the memory, to perform the method described in the first aspect or in any possible implementation of the first aspect.

In a third aspect, a non-transitory computer readable storage medium is provided. The non-transitory computer readable storage medium is configured to store computer programs which are operable with a computer to perform the method described in the first aspect or in any possible implementation of the first aspect.

DETAILED DESCRIPTION

The following will describe technical solutions of implementations of the disclosure with reference to the accompanying drawings.

The technical solutions of implementations of the disclosure are applicable to various communication systems, for example, a global system of mobile communication (GSM), a code division multiple access (CDMA) system, a wideband code division multiple access (WCDMA) system, a long term evolution (LTE) system, an LTE frequency division duplex (FDD) system, an LTE time division duplex (TDD) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a wireless local area networks (WLAN), a wireless fidelity (WiFi), a $5^{th}$ generation (5G) system, or other communication systems.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication. Implementations of the disclosure can also be applied to these communication systems.

A communication system in implementations of the disclosure may be applied to a carrier aggregation (CA) scenario, a dual connectivity (DC) scenario, or a standalone (SA) network deployment scenario.

Figure 1:
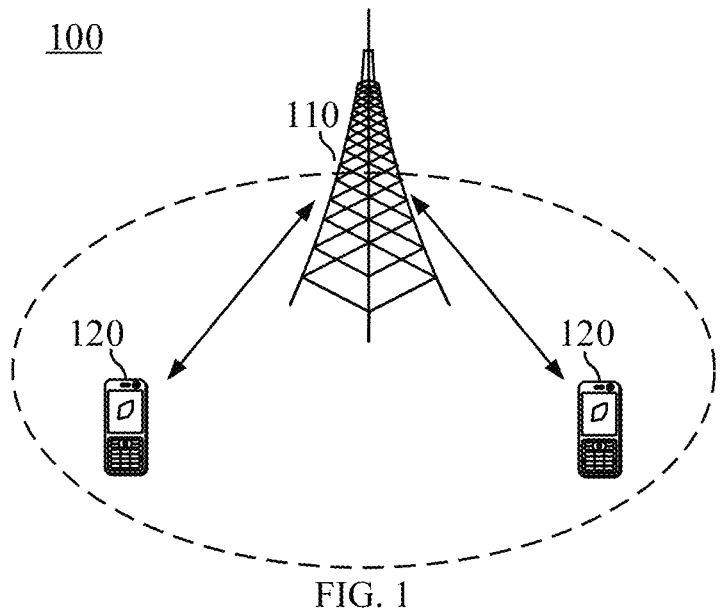
FIG. 1 is a schematic diagram of a possible wireless communication system applied in implementations of the disclosure.

Exemplarily, a communication system 100 applied in implementations of the disclosure is illustrated in FIG. 1. The communication system 100 may include a network device 110. The network device 110 may be a device that can communicate with a terminal device 120 (also referred to as "communication terminal" or "terminal"). The network device 110 can provide a communication coverage for a specific geographical area and communicate with terminal devices in the coverage area.

Optionally, the network device 110 may be a base transceiver station (BTS) in the GSM or CDMA, may also be a Node B (NB) in WCDMA, and may further be an evolutional Node B (eNB or eNodeB) in LTE, or a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future evolved public land mobile network (PLMN).

The wireless communication system 100 further includes at least one terminal device 120 in the coverage area of the network device 110. The terminal device 120 may be mobile or fixed. Optionally, the terminal device 120 may refer to a user equipment (UE), an access terminal, a subscriber unit, a subscriber station, a mobile station, a remote station, a remote terminal, a mobile device, a user terminal, a terminal, a wireless communication device, a user agent, or a user device. The terminal device may also be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, a terminal device in a 5G network, a terminal device in a future evolved PLMN, or the like, and implementations of the disclosure are not limited in this regard. Optionally, terminal devices 120 can communicate with each other through D2D communication.

The network device 110 provides services for a cell, and the terminal device 120 communicates with the network device 110 through a transmission resource (for example, a frequency domain resource or a spectrum resource) for the cell. The cell may be a cell corresponding to the network device 110. The cell may correspond to a macro base station, or may correspond to a base station corresponding to a small cell. The small cell may include: a metro cell, a micro cell, a pico cell, a femto cell, and the like. These small cells are characterized by small coverage and low transmission power and are adapted to provide data transmission service with high-rate.

FIG. 1 exemplarily illustrates one network device and two terminal devices, but the disclosure is not limited thereto. The wireless communication system 100 may also include multiple network devices, and there can be other numbers of terminal devices in a coverage area of each of the network devices. In addition, the wireless communication system 100 may further include other network entities such as a network controller, a mobile management entity, or the like.

At present, the $3^{rd}$ generation partnership project (3GPP) is studying non-terrestrial network (NTN) technology. NTN generally provides communication services to terrestrial users through satellite communication. Compared with terrestrial cellular network communication, satellite communication has many unique advantages. First, satellite communication is not constrained by areas of users. For example, terrestrial communication is unable to cover areas without communication coverage like sparsely populated areas as well as areas where communication devices cannot be set up, such as oceans, mountains, and deserts. In contrast, for satellite communication, one satellite can cover a large ground and the satellite can orbit the earth. Therefore, in theory, every corner on the earth can be covered for satellite communication. Second, satellite communication has greater social value. Remote mountainous area and poverty-stricken and underdeveloped countries or regions can be covered for satellite communication at a low cost, so that people in these areas can enjoy advanced voice communication and mobile internet technologies, thereby narrowing a digital gap with developed areas and thus promoting development of these areas. Third, a satellite has a long communication distance, and increase in communication distance will not lead to substantial increase in communication cost. Finally, satellite communication has high stability and is not constrained by natural disasters.

Communication satellites are classified into low-earth orbit (LEO) satellites, medium-earth orbit (MEO) satellites, geostationary earth orbit (GEO) satellites, high elliptical orbit (HEO) satellites, and the like according to different orbital altitudes. At present, studies mainly focus on the LEO satellite and the GEO satellite. For the LEO satellite, the orbital altitude thereof ranges from 500 km (kilometer) to 1500 km, a corresponding orbital period is about 1.5 hours to 2 hours, and a signal propagation delay of single-hop communication between users is generally less than 20 ms (millisecond). A satellite has a maximum visibility time of 20 minutes, a short signal propagation distance, and a less link loss, and does not have high requirements on transmission power for a user terminal. For the GEO satellite, the orbital altitude thereof is 35786 km, a rotation period around the earth thereof is 24 hours, and a signal propagation delay of single-hop communication between users is generally 250 ms.

In order to ensure the coverage of the satellite and increase the system capacity of the entire satellite communication system, the satellite uses multi-beams to cover the ground. One satellite can provide dozens of or even hundreds of beams for ground coverage, and one beam can cover a ground area with a diameter of tens to hundreds of kilometers.

In an NTN system, the terminal device still needs to perform random access. A random access procedure may be triggered mainly by the following events: (1) The terminal device establishes a wireless connection in initial access when the terminal device transitions from radio resource control (RRC)_IDLE to RRC_CONNECTED; (2) RRC connection reestablishment procedure, so that the terminal device re-establishes wireless connection after radio link failure (RLF); (3) The terminal device needs to establish uplink (UL) synchronization with a new cell; (4) Downlink (DL) data arrival during RRC_CONNECTED when UL synchronization status is "non-synchronized"; (5) UL data arrival during RRC_CONNECTED when UL synchronization status is "non-synchronized" or there is no available physical uplink control channel (PUCCH) resource for scheduling request (SR); (6) SR failure; (7) Request by RRC upon synchronous reconfiguration; (8) The terminal device transitions from RRC_INACTIVE to RRC_CONNECTED; (9) To establish time alignment upon secondary cell (SCell) addition; (10) Request for other system information (SI); (11) Beam failure recovery.

A method of implementations of the disclosure is applicable to a 2-step random access procedure and a 4-step random access procedure.

Figure 2:
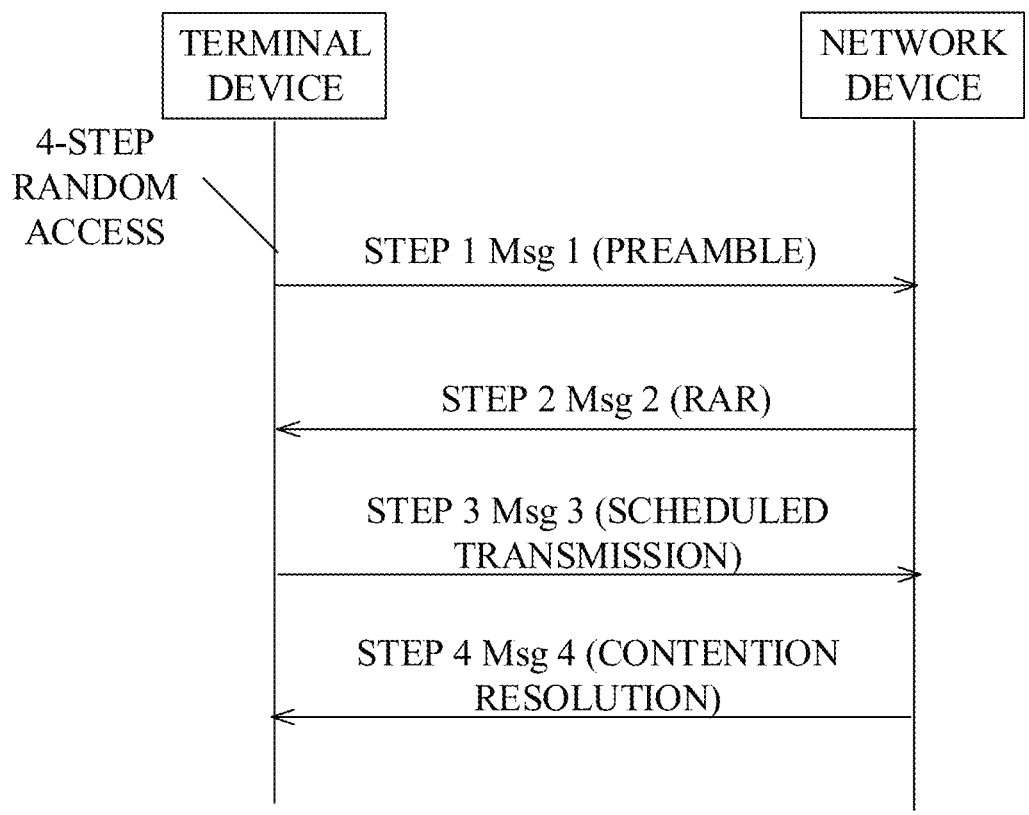
FIG. 2 is a schematic diagram illustrating a 4-step random access.

FIG. 2 is an interaction flowchart illustrating a 4-step random access. As illustrated in FIG. 2, a 4-step random access procedure may include the following four steps.

Step 1, a terminal device transmits message (Msg) 1 to a network device.

The terminal device selects a physical random access channel (PRACH) resource, and transmits a preamble selected by the terminal device on the selected PRACH. In the case of a contention-free random access, the PRACH resource and the preamble may be specified by the network device. Based on the preamble, the network device can estimate a UL timing and a size of a UL grant resource required by the terminal for transmission of Msg3.

Step 2, the network device transmits Msg 2 to the terminal device, that is, random access response (RAR) message.

After transmitting Msg 1, the terminal starts a random access response window (ra-ResponseWindow), and monitors a random access radio network temporary identifier (RA-RNTI) scrambled physical downlink control channel (PDCCH) in the ra-ResponseWindow. The RA-RNTI is correlated with a PRACH time-frequency resource used by the terminal device for transmission of the Msg 1.

Once the RA-RNTI scrambled PDCCH is received successfully, the terminal device can obtain a physical downlink shared channel (PDSCH) scheduled by the PDCCH, where the PDSCH includes an RAR. The RAR may contain the following information:

A backoff indicator (BI) contained in a subheader of the RAR: for indicating a backoff time for retransmission of the Msg 1;

A random access preamble identifier (RAP ID) in the RAR: the network device responds to a received preamble index.

A timing advance command (TAC) contained in a payload of the RAR: for UL timing adjustment;

UL grant: for scheduling a UL resource indication of Msg 3;

Temporary cell-radio network temporary identifier (TC-RNTI): for scrambling a PDCCH of Msg 4 during initial access.

If an RAR-RNTI scrambled PDCCH is received by the terminal device, and the RAR contains a preamble index transmitted by the terminal device, the terminal device considers that the RAR is successfully received.

For a contention-free random access, once the Msg 2 is successfully received by the terminal device, the random access procedure is completed. For a contention-based random access, after the Msg 2 is successfully received, the terminal device still needs to transmit Msg 3 and receive Msg 4.

Step 3, the terminal device transmits Msg 3 on a resource scheduled by the network device.

The Msg 3 is mainly used for notifying the network device which event has triggered the random access procedure. For example, in the case of a random access procedure for initial access, a UE identity (ID) and an establishment cause are carried in the Msg 3. In the case of RRC reestablishment, a connected state identifier and an establishment cause are carried.

Step 4, the network device transmits to the terminal device Msg 4, that is, random access contention resolution message.

On one hand, the Msg 4 is used for contention resolution; and on the other hand, the Msg 4 is used by the network device to transmit an RRC configuration message to the terminal device. Contention resolution may be in the following two manners: i) if a C-RNTI is carried in the Msg 3 by the terminal device, the Msg 4 uses a C-RNTI scrambled PDCCH for scheduling; ii) if no C-RNTI is carried in the Msg 3 by the terminal device, for example, in initial access, the Msg 4 uses a TC-RNTI scrambled PDCCH for scheduling. For contention resolution, the terminal device receives a PDSCH of the Msg 4, and matches a common control channel (CCCH) service data unit (SDU) in the PDSCH.

Figure 3:
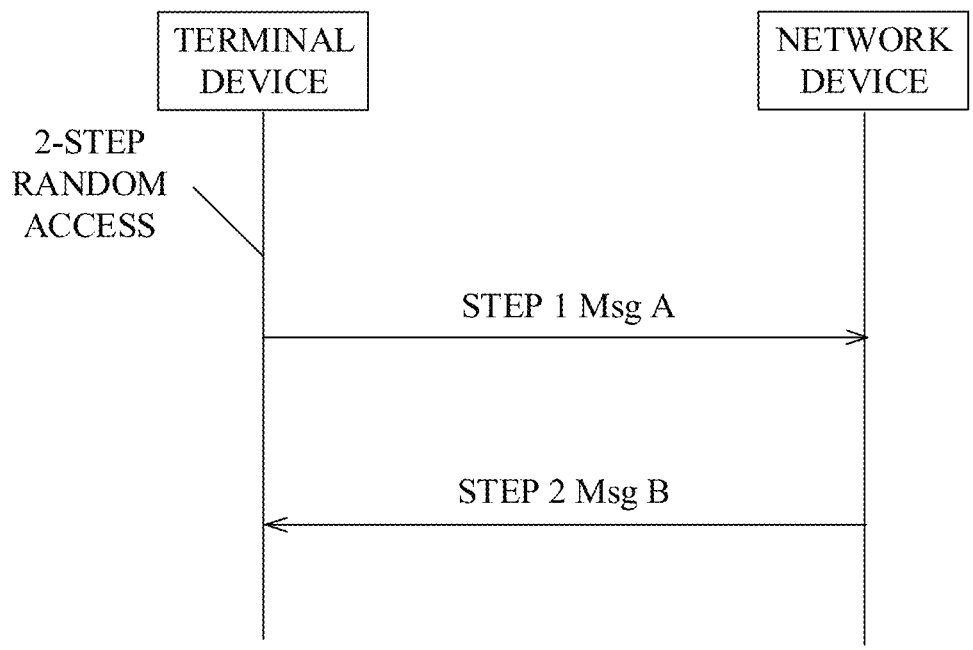
FIG. 3 is a schematic diagram illustrating a 2-step random access.

FIG. 3 is an interaction flowchart illustrating a 2-step random access. Compared with a 4-step random access procedure, a 2-step random access procedure can reduce delay and signaling overhead. As illustrated in FIG. 3, in step 1, a terminal device transmits Msg A to a network device, where the Msg A includes all or part of Msg 1 and Msg 3 in a 4-step random access procedure. In step 2, the network device transmits Msg B to the terminal device, where the Msg B includes all or part of Msg 2 and Msg 4 in a 4-step random access procedure. After transmitting the Msg A, the terminal device starts a reception window for the Msg B, to detect and receive the Msg B in the window.

For a 4-step random access procedure, after transmitting the Msg 1, the terminal device monitors an RA-RNTI scrambled PDCCH in an ra-ResponseWindow, to receive a corresponding RAR message. If no RAR message is received by the terminal device in the ra-ResponseWindow, the terminal device considers that the random access fails, and then the terminal device retransmits the Msg 1. When the number of times of transmission of the Msg 1 by the terminal device reaches a threshold, the terminal device will indicate to a higher layer that a random access problem occurs. The ra-ResponseWindow starts from a $1^{st}$ PDCCH occasion after the terminal device transmits the Msg 1. A length or duration of the ra-ResponseWindow is configured by the network device. According to present standards, a maximum value that can be supported by the ra-ResponseWindow is 10 ms.

Similarly, for a 2-step random access procedure, the terminal device also starts a time window used for reception of the Msg B after transmitting the Msg A, and monitors the Msg B from the network device in the time window. If no Msg B is received by the terminal device in the time window, the terminal device considers that the random access fails.

Compared with a cellular network, in NTN, a signal propagation delay between the terminal device and a satellite increases substantially. The satellite has a wide coverage range. For different terminal devices in a coverage range of the same satellite, since these terminal devices are in different locations, a signal propagation delay between each of these terminal devices and the satellite may be quite different.

On one hand, the terminal device at least has to wait for one round trip time (RTT) from when the Msg 1 is transmitted to when the Msg 2 is received. In a cellular network, the network device has a small coverage range, and a signal transmission time between the terminal device and the network device is short. Therefore, a UE can start the ra-ResponseWindow on the PDCCH occasion after transmitting the Msg 1. In contrast, in an NTN system, a signal transmission time between the terminal device and the satellite is relatively long, and the RTT may be up to 541.46 ms. However, a time interval between when the terminal device transmits the Msg 1 to the $1^{st}$ PDCCH occasion is likely to be shorter than one RTT. If the terminal device still starts the ra-ResponseWindow on the $1^{st}$ PDCCH occasion after transmitting the Msg 1, the ra-ResponseWindow may be started too early because the RTT is too long, which results in invalid RAR monitoring by the terminal device and thus undoubtedly increases power consumption of the terminal device.

On the other hand, in a coverage range of the same network device in a cellular network, a difference between signal transmission times of different terminal devices to the network device is small. For different terminal devices that transmit the Msg 1 on the same random access channel (RACH) occasion resource, these transmitted Msg 1 will arrive at the network device at substantially the same time. Therefore, at present, a time window is configured mainly with respect to a time spent by the network device in processing the Msg 1 and scheduling the Msg 2. In contrast, in NTN, the satellite has a wide coverage range, different terminal devices in a coverage range of the same satellite are at different locations, and a communication signal transmission time between each of these terminal devices and the satellite may be quite different. Therefore, if a time window configured is not long enough, a terminal device that is relatively far from the satellite will probably be unable to receive the RAR in the time window because the RTT is too long. If the time window configured is too long, it will prolong RAR monitoring time of the terminal device and as a result, power consumption of the terminal device will be increased.

Similarly, for a contention resolution timer used by the terminal device for reception of the Msg 4, there are similar problems. The terminal device detects the Msg 4 transmitted by the network device within a timing duration of the timer.

Implementations of the disclosure provide a method for random access, which is conducive to flexible adjustment of a time window, thereby achieving efficient random access.

Figure 4:
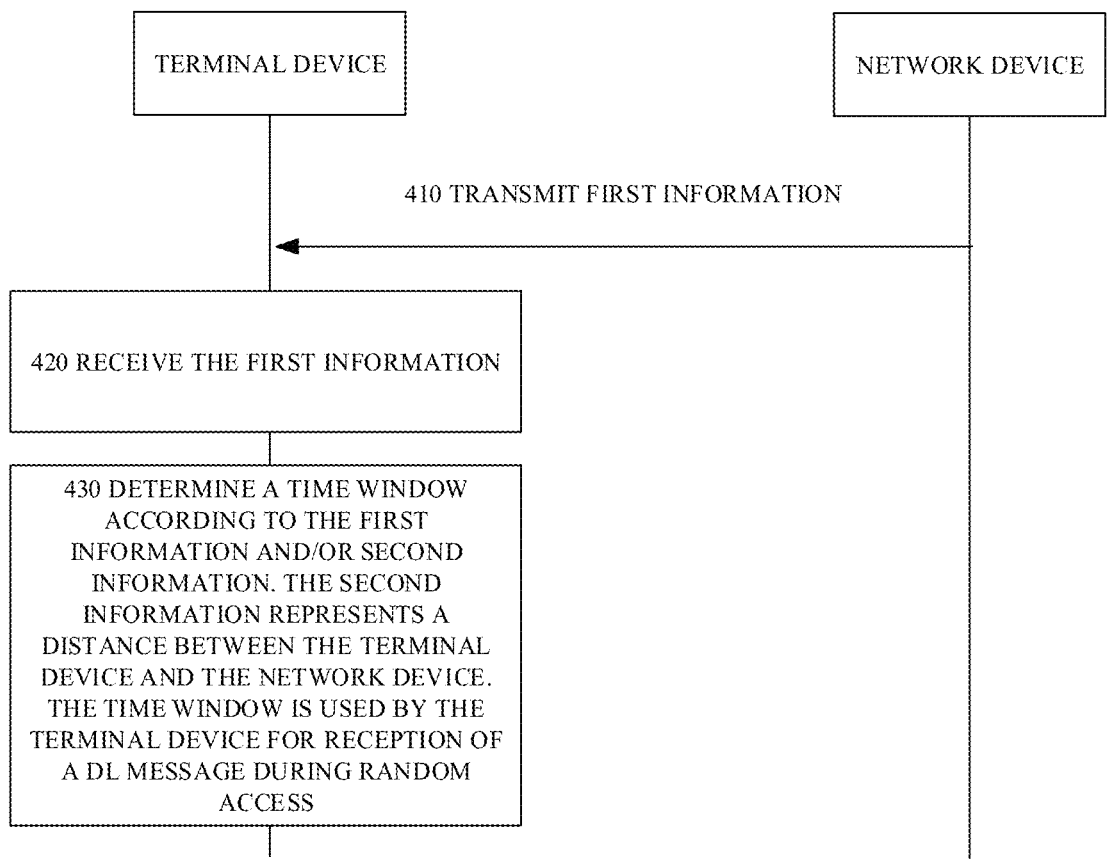
FIG. 4 is an interaction flowchart of a method for random access according to implementations of the disclosure.

FIG. 4 is a schematic flowchart of random access according to implementations of the disclosure. The method 400 illustrated in FIG. 4 may be performed by a network device and a terminal device. The network device may be, for example, the network device 110 illustrated in FIG. 1. The terminal device may be, for example, the terminal device 120 illustrated in FIG. 1. The terminal device may or may not have a positioning capability. The method 400 is applicable to an NTN system. As illustrated in FIG. 4, the method 400 includes the following.

At 410, the network device transmits first information to the terminal device.

At 420, the terminal device receives the first information.

At 430, the terminal device determines a time window according to the first information and/or second information. The second information represents a distance between the terminal device and the network device. The time window is used by the terminal device for reception of a DL message during random access.

The first information includes an adjustment parameter, the adjustment parameter is used for adjusting a nominal value of a time parameter of the time window, and the time parameter includes a duration and/or an offset of the time window.

In this implementation, a time window used for DL message transmission during random access is configured with a nominal value. The terminal device adjusts the nominal value according to the adjustment parameter and the distance between the terminal device and the network device, to obtain a time parameter of a time window to-be-used, such that terminal devices at different locations can flexibly adjust their own time windows, which can avoid invalid DL message monitoring, thereby achieving efficient random access.

The DL message may be, for example, an RAR message in a 4-step random access procedure, a random access contention resolution message (that is, Msg 4) in a 4-step random access procedure, or Msg B in a 2-step random access procedure. It should be understood that, a time window used by the terminal device for reception of the Msg 4 may be implemented by a contention resolution timer, that is, the time window is a timing duration of the timer.

The time parameter includes the duration and/or the offset of the time window. The offset of the time window is a time offset of a start of the time window. For example, the offset of a time window used for receiving an RAR message is TA, the terminal device starts the time window a TA duration after transmission of Msg 1. For another example, the offset of a time window used for receiving Msg 4 is TB, the terminal device starts the contention resolution timer a TB duration after transmission of Msg 3.

In implementations of the disclosure, the distance between the terminal device and the network device can be a distance between the terminal device and a satellite, or a sum of the distance between the terminal device and the satellite and a distance between the satellite and a ground station.

Specifically, the network device in implementations of the disclosure may be the satellite, or may be the ground station, such as various types of network device illustrated in FIG. 1. For example, for a transparent GEO/LEO, the satellite can implement functions of a base station. In this case, the network device is the satellite, and between the terminal device and the network device is the distance between the terminal device and the satellite. For another example, for a regenerative GEO/LEO, UL data from the terminal device is transmitted to the ground station via the satellite, and DL data from the ground station is transmitted to the terminal device via the satellite. In this case, the network device is the ground station, and the distance between the terminal device and the network device is the sum of the distance between the terminal device and the satellite and the distance between the satellite and the ground station.

For an LEO, the satellite is moving, and accordingly, the distance between the satellite and the ground station varies. In contrast, for a GEO, the satellite is stationary, and the distance between the satellite and the ground station is fixed.

The adjustment parameter includes, for example, at least one of: a difference between the time parameter and the nominal value of the time parameter, an adjustment step size used for periodic adjustment of the nominal value, an adjustment factor used for periodic adjustment of the nominal value, a mapping between distances and time parameters, or a preset distance corresponding to the nominal value.

For example, the adjustment parameter is the difference between the time parameter and the nominal value of the time parameter. Once receiving the difference, the terminal device determines a sum of the nominal value and the difference as the time parameter of the time window.

For another example, the adjustment parameter is the adjustment step size used for periodic adjustment of the nominal value. The time parameter is a sum of the nominal value and N times the adjustment step size, where N is the number of adjustment periods experienced by the terminal device.

Suppose that the adjustment step size is 10 ms and a nominal value of the length of the time window is 100 ms, the length of the time window is 100+N×10 ms, where N is the number of adjustment periods experienced by the terminal device. Suppose that a time period is 80 ms, the length of the time window is 110 ms after one time-period, i.e. 80 ms; and the length of the time window is 120 ms after two time-periods, i.e. 160 ms. It should be understood that, the adjustment step size may be positive or negative. Movement of the satellite or movement of the terminal device both may result in change in the distance between the terminal device and the network device. Therefore, if the distance is becoming shorter, the adjustment step size may be negative; and if the distance is becoming longer, the adjustment step size may be positive. The terminal device can perform positive adjustment or negative adjustment on the nominal value according to a change trend of the distance.

Similarly, for the offset of the time window, a nominal value may also be configured, and the nominal value corresponding to the offset may be adjusted based on the adjustment step size. Suppose that the nominal value of the offset of the time window is 50 ms and the adjustment step size is 10 ms, the offset of the time window is 50 ms+1×10 ms=60 ms after one time period. The terminal device starts the time window 60 ms later than transmitting Msg 1, to detect an RAR message. For example, the terminal device may start the time window in a $1^{st}$ PDCCH subframe 60 ms after transmission of Msg 1.

The adjustment period described above is a time period such as 80 ms, but implementations of the disclosure are not limited in this regard. The adjustment period may also be a moving distance period of the terminal device, that is, each time the terminal device moves by a certain distance, the time parameter of the time window is adjusted once based on the adjustment step size.

For another example, the adjustment parameter is the adjustment factor used for periodic adjustment of the nominal value. The time parameter is a product of N×M and the nominal value, where N is the number of adjustment periods experienced by the terminal device and M is the adjustment factor.

Suppose that the adjustment step size is 10 ms, a nominal value of the length of the time window is 100 ms, and the adjustment factor is 1.2, the length of the time window is 100+N×1.2×10 ms, where N is the number of adjustment periods experienced by the terminal device. Suppose that the time period is 120 ms, the length of the time window is 112 ms after one time period, i.e. 120 ms; and the length of the time window is 124 ms after two time periods, i.e. 240 ms.

For another example, the adjustment parameter is the preset distance corresponding to the nominal value. The time parameter is a product of the nominal value and a distance ratio, where the distance ratio is a ratio of the distance between the terminal device and the network device to the preset distance.

Suppose that a nominal value of the length of the time window is 100 ms and the preset distance corresponding to the nominal value is 100 km. If the distance between the terminal device and the network device is currently 150 km, the distance ratio of the distance between the terminal device and the network device to the preset distance is 150 km/100 km=1.5, and accordingly, the length of the time window is 100 ms×1.5=150 ms.

Suppose that a nominal value of the offset of the time window is 50 ms and the preset distance corresponding to the nominal value is 100 km. If the distance between the terminal device and the network device is currently 150 km, the distance ratio of the distance between the terminal device and the network device to the preset distance is 150 km/100 km=1.5, and accordingly, the offset of the time window is 50 ms×1.5=75 ms. The terminal device starts the time window 75 ms after transmission of Msg 1, to detect an RAR message. For example, the terminal device may start the time window in a $1^{st}$ PDCCH subframe 75 ms after transmission of Msg 1.

For another example, the adjustment parameter is the mapping between distances and time parameters. The time parameter is a time parameter corresponding to the distance between the terminal device and the network device in the mapping.

As an example, the mapping may be presented in the form of a table, such as a mapping between time-window lengths and distances shown in table 1. The terminal device determines the length of the time window used for reception of the DL message according to the distance between the terminal device and the network device. For example, if the distance between the terminal device and the network device is in distance range 1, the terminal device adopts a time window with a duration of T1; and if the distance between the terminal device and the network device is in distance range N, the terminal device adopts a time window with a duration of TN. Table 1 may also contain a mapping between distances and offsets. Alternatively, table 1 may contain a mapping between distances, durations, and offsets. As such, the terminal device can determine both a length and a starting offset of a time window to-be-used according to the distance between the terminal device and the network device.

TABLE 1

| Distance | Duration of time window |
| --- | --- |
| Distance range 1 | $T_1$ |
| Distance range 2 | $T_2$ |
| . . . | . . . |
| Distance range N | $T_N$ |

The first information may be carried in system information (SI), RRC signaling, downlink control information (DCI), or an RAR message.

For example, for a terminal device in RRC IDLE, the network device broadcasts the first information in the SI.

For another example, for a terminal device in RRC_CONNECTED, such as a handover or a random access procedure that needs to obtain UL synchronization, the network device can configure the first information for the terminal device through the RRC signaling.

For another example, for a PDCCH ordered RACH, the network device can configure the first information for the terminal device through the DCI.

For another example, the network device may also configure the first information in an RAR.

It should be understood that the first information may be transmitted to the terminal device by the network device, or may be specified in a protocol, and the disclosure is not limited in this regard.

The nominal value of the time parameter may be carried in the first information, or may be transmitted to the terminal device through another message, or may be specified in a protocol.

The distance between the terminal device and the network device described above may be represented by the second information. The second information includes, for example, at least one of: a timing advance (TA), an RTT, a propagation delay, a satellite ephemeris, the distance between the terminal device and the network device, or a moving trajectory of the terminal device relative to the network device.

For example, if the terminal device has a positioning capability, the distance between the terminal device and the network device can be determined according to a position of the terminal device and a position of the satellite. In addition, the TA, the RTT, the propagation delay, or the like may be determined according to the distance, where any of these information can be used for representing the distance. Therefore, if the distance is represented by the TA, the RTT, the propagation delay, or the like, the "distance" in all of the foregoing examples may be replaced by the TA, the RTT, the propagation delay, or the like.

For instance, suppose that the nominal value of the length of the time window is 200 ms, and the preset distance corresponding to the nominal value is represented by the RTT and RTT=100 ms. If the terminal device measures that the RTT is currently 150 ms, the length of the time window is 200 ms×150 ms/100 ms=300 ms.

For another example, suppose that the nominal value of the offset of the time window is 50 ms, and the preset distance corresponding to the nominal value is represented by the RTT and RTT=100 ms. If the terminal device measures that the RTT is currently 150 ms, the offset of the time window is 50 ms×150 ms/100 ms=75 ms. The terminal device starts the time window 75 ms after transmission of Msg 1, to detect an RAR message. For example, the terminal device may start the time window in a $1^{st}$ PDCCH subframe 75 ms after transmission of Msg 1.

If the terminal device does not have a positioning capability, the terminal device can adjust the nominal value according to the adjustment parameter such as the adjustment step size, the adjustment factor, or the like, thereby obtaining the time parameter of the time window.

Optionally, the method further includes the following. The terminal device reports the time parameter. Accordingly, the network device receives the time parameter transmitted by the terminal device.

As such, once receiving the time parameter, the network device can transmit the DL message to the terminal device in the time window corresponding to the time parameter.

Figure 5:
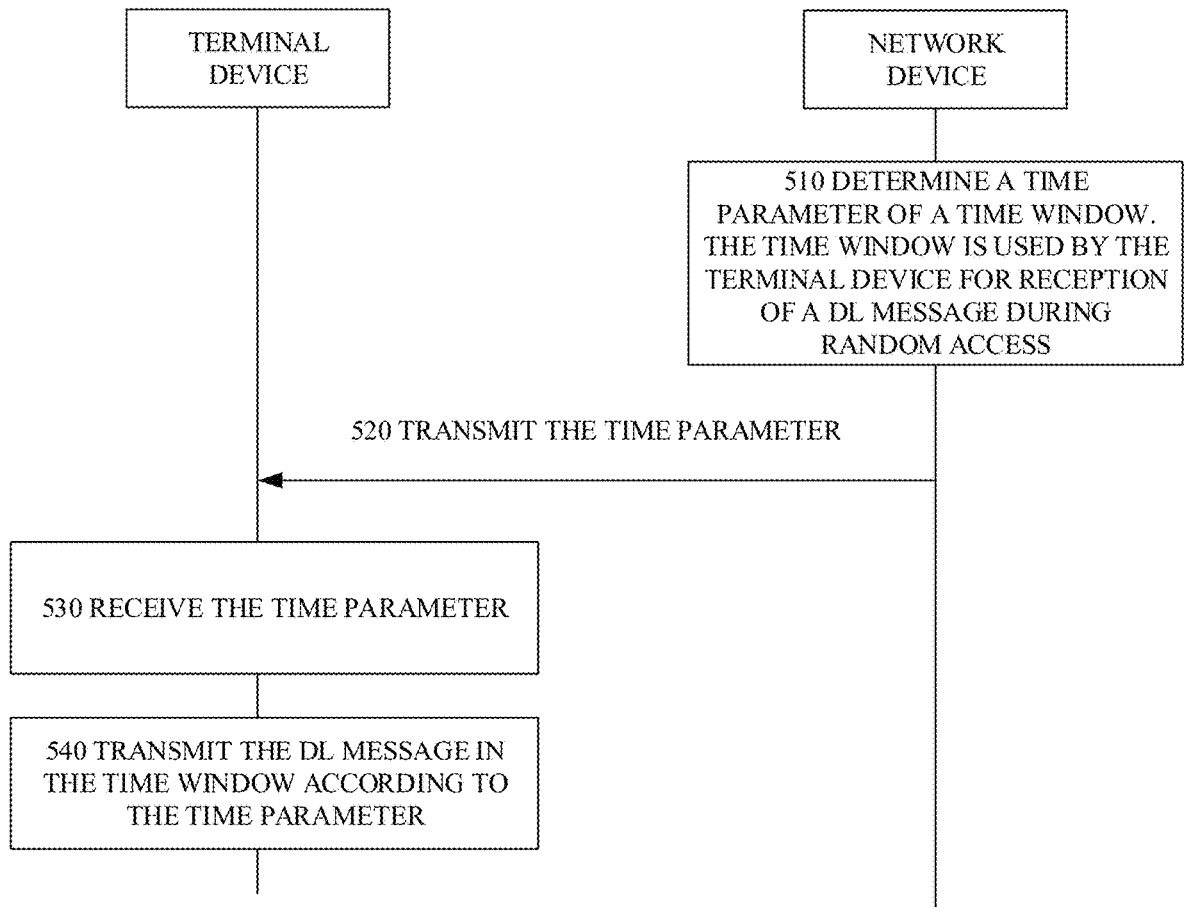
FIG. 5 is an interaction flowchart of a method for random access according to other implementations of the disclosure.

FIG. 5 is an interaction flowchart of a method for random access according to other implementations of the disclosure. The method 500 illustrated in FIG. 5 may be performed by a network device and a terminal device. The network device may be, for example, the network device 110 illustrated in FIG. 1. The terminal device may be, for example, the terminal device 120 illustrated in FIG. 1. The terminal device may or may not have a positioning capability. The method 500 is applicable to an NTN system. As illustrated in FIG. 5, the method 500 includes the following.

At 510, the network device determines a time parameter of a time window. The time window is used by the terminal device for reception of a DL message during random access.

At 520, the network device transmits the time parameter to the terminal device.

At 530, the terminal device receives the time parameter.

At 540, the terminal device transmits the DL message in the time window according to the time parameter.

In this implementation, a time window used for DL message transmission during random access is configured with a nominal value. The network device can adjust the nominal value according to the adjustment parameter and a distance between the terminal device and the network device to obtain a time parameter of a time window to-be-used, and transmit the time parameter to the terminal device. In this way, terminal devices at different locations can flexibly adjust their own time windows, which can avoid invalid DL message monitoring, thereby achieving efficient random access.

In an implementation, at 510, the network device can determine the time parameter of the time window according to first information and/or second information. The second information represents the distance between the terminal device and the network device.

The first information includes an adjustment parameter, the adjustment parameter is used for adjusting a nominal value of the time parameter of the time window, and the time parameter includes a duration and/or an offset of the time window.

The adjustment parameter includes at least one of: a difference between the time parameter and the nominal value of the time parameter, an adjustment step size used for periodic adjustment of the nominal value, an adjustment factor used for periodic adjustment of the nominal value, a mapping between distances and time parameters, or a preset distance corresponding to the nominal value.

For example, the adjustment parameter is the difference between the time parameter and the nominal value of the time parameter. Once receiving the difference, the terminal device determines a sum of the nominal value and the difference as the time parameter of the time window.

For another example, the adjustment parameter is the adjustment step size used for periodic adjustment of the nominal value. The time parameter is a sum of the nominal value and N times the adjustment step size, where N is the number of adjustment periods experienced by the terminal device.

For another example, the adjustment parameter is the adjustment factor used for periodic adjustment of the nominal value. The time parameter is a product of N×M and the nominal value, where N is the number of adjustment periods experienced by the terminal device and M is the adjustment factor.

For another example, the adjustment parameter is the preset distance corresponding to the nominal value. The time parameter is a product of the nominal value and a distance ratio, where the distance ratio is a ratio of the distance between the terminal device and the network device to the preset distance.

For another example, the adjustment parameter is the mapping between distances and time parameters. The time parameter is a time parameter corresponding to the distance between the terminal device and the network device in the mapping.

The first information may be carried in SI, RRC signaling, DCI, or an RAR message.

The distance between the terminal device and the network device described above may be represented by the second information. The second information includes, for example, at least one of: a TA, an RTT, a propagation delay, a satellite ephemeris, the distance between the terminal device and the network device, or a moving trajectory of the terminal device relative to the network device.

It should be understood that, for the process of determining the time parameter of the time window by the network device according to the first information and/or the second information, reference can be made to the foregoing process of determining the time parameter of the time window by the terminal device according to the first information and/or the second information, which will not be repeated herein for the sake of simplicity.

It is to be noted that, various implementations described in the disclosure and/or technical features in the various implementations may be implemented in any combination with each other without conflict, and technical solutions thus obtained shall also fall within the protection cope of the disclosure.

In various implementations of the disclosure, the magnitude of a sequence number of each process does not mean an order of execution, and the order of execution of each process should be determined by its function and an internal logic and shall not constitute any limitation to an implementation process of implementations of the disclosure.

The method for random access of implementations of the disclosure has been described in detail above. The following will describe devices of implementations of the disclosure with reference to FIG. 6 to FIG. 10. Technical features described in method implementations are applicable to the following apparatus implementations.

Figure 6:
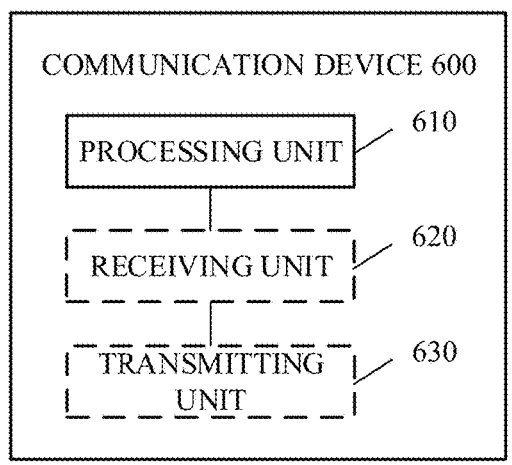
FIG. 6 is a schematic block diagram of a communication device according to implementations of the disclosure.

FIG. 6 is a schematic block diagram of a communication device 600 according to implementations of the disclosure. As illustrated in FIG. 6, the communication device 600 includes a processing unit 610.

The processing unit 610 is configured to determine a time window according to first information and/or second information. The second information represents a distance between a terminal device and a network device, where the time window is used by the terminal device for reception of a DL message during random access.

The first information includes an adjustment parameter, the adjustment parameter is used for adjusting a nominal value of a time parameter of the time window, and the time parameter includes a duration and/or an offset of the time window.

Therefore, a time window used for DL message transmission during random access is configured with a nominal value, and the nominal value is adjusted according to the adjustment parameter and the distance between the terminal device and the network device, to obtain a time parameter of a time window to-be-used. As such, terminal devices at different locations can flexibly adjust their own time windows, which can avoid invalid DL message monitoring, thereby achieving efficient random access.

Optionally, the DL message includes an RAR message and/or a random access contention resolution message.

Optionally, the adjustment parameter includes at least one of: a difference between the time parameter and the nominal value of the time parameter, an adjustment step size used for periodic adjustment of the nominal value, an adjustment factor used for periodic adjustment of the nominal value, a mapping between distances and time parameters, or a preset distance corresponding to the nominal value.

Optionally, the time parameter is a sum of the nominal value and the difference.

Optionally, the time parameter is a sum of the nominal value and N times the adjustment step size, where N is the number of adjustment periods experienced by the terminal device.

Optionally, the time parameter is a product of N×M and the nominal value, where N is the number of adjustment periods experienced by the terminal device and M is the adjustment factor.

Optionally, the adjustment period includes a time period experienced by the terminal device and/or a moving distance period of the terminal device.

Optionally, the time parameter is a time parameter corresponding to the distance between the terminal device and the network device in the mapping.

Optionally, the time parameter is a product of the nominal value and a distance ratio, where the distance ratio is a ratio of the distance between the terminal device and the network device to the preset distance.

Optionally, the second information includes at least one of: a TA, an RTT, a propagation delay, a satellite ephemeris, the distance between the terminal device and the network device, or a moving trajectory of the terminal device relative to the network device.

Optionally, the communication device 600 is operable as the terminal device. The terminal device includes a receiving unit 620. The receiving unit 620 is configured to receive the first information transmitted by the network device.

Optionally, the first information further includes the nominal value.

Optionally, the first information is carried in SI, RRC signaling, DCI, or an RAR message.

Optionally, the communication device 600 is operable as the terminal device. The terminal device includes a transmitting unit 630. The transmitting unit 630 is configured to report the time parameter.

Optionally, the communication device 600 is operable as the network device. The network device includes a transmitting unit 630. The transmitting unit 630 is configured to transmit the time parameter to the terminal device.

Optionally, when the terminal device has a positioning capability, the time window is determined by the terminal device according to the first information and/or the second information. Alternatively, when the terminal device does not have a positioning capability, the time window is determined by the terminal device according to the first information.

Optionally, the distance between the terminal device and the network device includes a distance between the terminal device and a satellite or a sum of the distance between the terminal device and the satellite and a distance between the satellite and a ground station.

Optionally, the communication device is applicable to an NTN system.

It should be understood that, the communication device 600 can implement operations performed by the terminal device or the network device in the method illustrated in FIG. 4 or the method illustrated in FIG. 5, which will not be elaborated again herein for the sake of simplicity.

Figure 7:
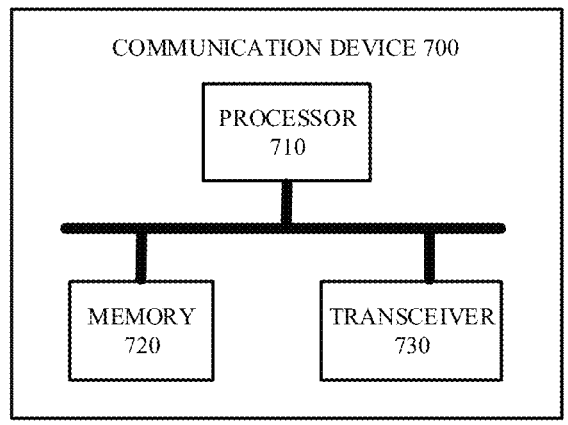
FIG. 7 is a schematic structural diagram of a communication device according to implementations of the disclosure.

FIG. 7 is a schematic structural diagram of a communication device 700 according to implementations of the disclosure. The communication device 700 illustrated in FIG. 7 includes a processor 710. The processor 710 is configured to invoke and execute computer programs stored in a memory, to perform the method in implementations of the disclosure.

Optionally, as illustrated in FIG. 7, the communication device further includes the memory 720. The processor 710 can invoke and execute the computer programs stored in the memory 720, to perform the method in implementations of the disclosure.

The memory 720 may be a separate device independent of the processor 710, or may be integrated into the processor 710 of the disclosure.

Optionally, as illustrated in FIG. 7, the communication device 700 can further include a transceiver 730. The processor 710 can control the transceiver 730 to communicate with other devices, for example, to send information or data to other devices, or to receive information or data from other devices.

The transceiver 730 may include a transmitter and a receiver. The transceiver 730 may further include an antenna, where one or more antenna can be provided.

Optionally, the communication device 700 may be operable as the terminal device of implementations of the disclosure, and the communication device 700 can implement the operations performed by the terminal device described in various methods of implementations of the disclosure, which will not be repeated herein for the sake of simplicity.

Optionally, the communication device 700 may be operable as the network device of implementations of the disclosure, and the communication device 700 can implement the operations performed by the network device described in various methods of implementations of the disclosure, which will not be repeated herein for the sake of simplicity.

Figure 8:
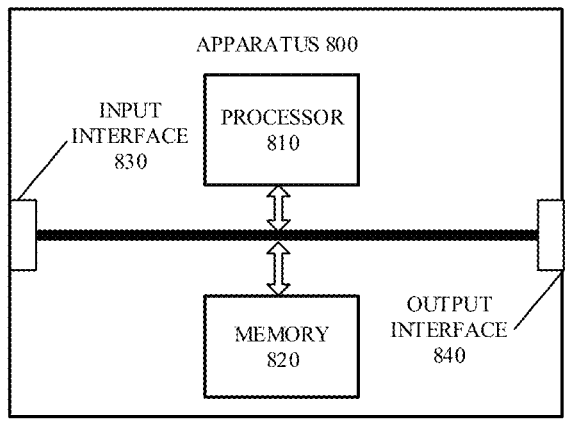
FIG. 8 is a schematic structural diagram of an apparatus for random access according to implementations of the disclosure.

FIG. 8 is a schematic structural diagram of an apparatus for random access provided in implementations of the disclosure. The apparatus 800 illustrated in FIG. 8 includes a processor 810. The processor 810 is configured to invoke and execute computer programs stored in a memory to perform the method in implementations of the disclosure.

Optionally, as illustrated in FIG. 8, the apparatus 800 further includes the memory 820. The processor 810 can invoke and execute the computer programs stored in the memory 820 to perform the method in implementations of the disclosure.

The memory 820 may be a separate device independent of the processor 810, or may be integrated into the processor 810.

Optionally, the apparatus 800 may further include an input interface 830. The processor 810 can control the input interface 830 to communicate with other devices or chips, for example, to acquire information or data sent by other devices or chips.

Optionally, the apparatus 800 may further include an output interface 840. The processor 810 can control the output interface 840 to communicate with other devices or chips, for example, to output information or data to other devices or chips.

Optionally, the apparatus 800 is applicable to the network device of implementations of the disclosure. The apparatus can implement the operations performed by the network device described in various methods of implementations of the disclosure, which will not be repeated herein for the sake of simplicity.

Optionally, the apparatus 800 is applicable to the terminal device of implementations of the disclosure. The apparatus can implement the operations performed by the terminal device described in various methods of implementations of the disclosure, which will not be repeated herein for the sake of simplicity.

Optionally, the apparatus 800 may be operable as a chip. The chip herein may also be a system-on-chip (SOC).

The processor in implementations of the disclosure may be an integrated circuit chip with signal processing capabilities. During implementation, each step of the foregoing method implementations may be completed by an integrated logic circuit of hardware in the processor or an instruction in the form of software. The processor described above may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations of the disclosure can be implemented or executed. The general purpose processor may be a microprocessor, or the processor may be any conventional processor or the like. The steps of the method disclosed in implementations may be directly implemented as a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

The memory in implementations of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). The memory of the systems and methods described herein is intended to include, but is not limited to, these and any other suitable types of memory.

The above description of the memory is intended for illustration rather than limitation. For example, the memory in implementations of the disclosure may also be an SRAM, a DRAM, an SDRAM, a DDR SDRAM, an ESDRAM, an SLDRAM, a DR RAM, etc.

In other words, the memory in implementations of the disclosure is intended to include, but is not limited to, these and any other suitable types of memory.

Figure 9:
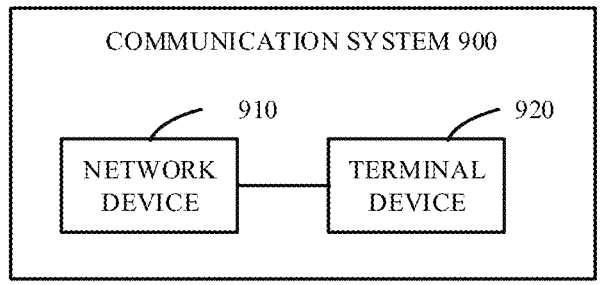
FIG. 9 is a schematic diagram of a communication system according to implementations of the disclosure.

FIG. 9 is a schematic diagram of a communication system 900 according to implementations of the disclosure. As illustrated in FIG. 9, the communication system 900 includes a network device 910 and a terminal device 920.

The network device 910 is configured to transmit first information to the terminal device. The terminal device 920 is configured to receive the first information, and determine a time window according to the first information and/or second information. The second information represents a distance between the terminal device and the network device, where the time window is used by the terminal device for reception of a DL message during random access. The first information includes an adjustment parameter, the adjustment parameter is used for adjusting a nominal value of a time parameter of the time window, and the time parameter includes a duration and/or an offset of the time window.

The network device 910 can implement functions of the network device described in the method illustrated in FIG. 4, and the network device 910 may be structured like the communication device 600 illustrated in FIG. 6, which will not be repeated herein for the sake of simplicity.

The terminal device 920 can implement functions of the terminal device described in the method illustrated in FIG. 4, and the terminal device 920 may be structured like the communication device 600 illustrated in FIG. 6, which will not be repeated herein for the sake of simplicity.

Figure 10:
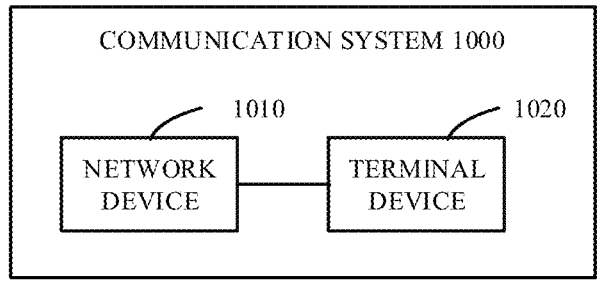
FIG. 10 is a schematic diagram of a communication system according to other implementations of the disclosure.

FIG. 10 is a schematic diagram of a communication system 1000 according to other implementations of the disclosure. As illustrated in FIG. 10, the communication system 1000 includes a network device 1010 and a terminal device 1020.

The network device 1010 is configured to determine a time parameter of a time window used by the terminal device for reception of a DL message during random access, and transmit the time parameter to the terminal device. The terminal device 1020 is configured to receive the time parameter, and transmit the DL message in the time window according to the time parameter.

The network device 1010 can implement functions of the network device described in the method illustrated in FIG. 5, and the network device 1010 may be structured like the communication device 600 illustrated in FIG. 6, which will not be repeated herein for the sake of simplicity.

The terminal device 1020 can implement functions of the terminal device described in the method illustrated in FIG. 5, and the terminal device 1020 may be structured like the communication device 600 illustrated in FIG. 6, which will not be repeated herein for the sake of simplicity.

Implementations of the disclosure further provide a computer readable storage medium. The computer readable storage medium is configured to store computer programs. Optionally, the computer readable storage medium is applicable to the terminal device of implementations of the disclosure. The computer programs, when executed, are operable with a computer to implement the operations performed by the terminal device described in various methods of implementations of the disclosure, which will not be repeated herein for the sake of simplicity. Optionally, the computer readable storage medium is applicable to the network device of implementations of the disclosure. The computer programs, when executed, are operable with a computer to implement the operations performed by the network device described in various methods of implementations of the disclosure, which will not be repeated herein for the sake of simplicity.

Implementations of the disclosure further provide a computer program product. The computer program product includes computer program instructions. Optionally, the computer program product is applicable to the terminal device of implementations of the disclosure. The computer program instructions, when executed, are operable with a computer to implement the operations performed by the terminal device described in various methods of implementations of the disclosure, which will not be repeated herein for the sake of simplicity. Optionally, the computer program product is applicable to the network device of implementations of the disclosure. The computer program instructions, when executed, are operable with a computer to implement the operations performed by the network device described in various methods of implementations of the disclosure, which will not be repeated herein for the sake of simplicity.

Implementations of the disclosure further provide a computer program. Optionally, the computer program is applicable to the terminal device of implementations of the disclosure. The computer program, when executed by a computer, is operable with the computer to implement the operations performed by the terminal device described in various methods of implementations of the disclosure, which will not be repeated herein for the sake of simplicity. Optionally, the computer program is applicable to the network device of implementations of the disclosure. The computer program, when executed by a computer, is operable with the computer to implement the operations performed by the network device described in various methods of implementations of the disclosure, which will not be repeated herein for the sake of simplicity.

The terms "system" and "network" in implementations of the disclosure are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

In implementations of the disclosure, "B corresponding to A" means that B is associated with A, and B can be determined according to A. However, it should be understood that, "B is determined according to A" does not mean that B is determined according to A only, and B may also be determined according to A and/or other information.

Those of ordinary skill in the art will appreciate that units and algorithmic operations of various examples described in connection with implementations of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations of the disclosure may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the solutions of the disclosure.

In addition, various functional units described in implementations of the disclosure may be integrated into one processing unit or may be present as a number of physically separated units, and two or more units may be integrated into one.

If the functional units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for random access, performed by a terminal device and comprising:
receiving, by the terminal device, a downlink (DL) message during random access in a time window, wherein the time window is determined by the terminal device or a network device according to first information and second information, the second information representing a distance between the terminal device and the network device, and the second information comprising a timing advance (TA);
wherein the first information comprises an adjustment parameter and the adjustment parameter is used for adjusting a nominal value of a time parameter of the time window, wherein the time parameter comprising an offset of the time window, and the nominal value of the time parameter is a defined offset value;
wherein the adjustment parameter comprises at least one of:
a difference between the time parameter and the nominal value of the time parameter;
an adjustment step size used for periodic adjustment of the nominal value;
an adjustment factor used for periodic adjustment of the nominal value;
a mapping between distances and time parameters; or
a preset distance corresponding to the nominal value;
wherein the time parameter is a sum of the nominal value and N times the adjustment step size, and N is a number of adjustment periods experienced by the terminal device.

2. The method of claim 1, wherein the DL message comprises a random access response (RAR) message and/or a random access contention resolution message.

3. The method of claim 1, wherein the time parameter is a sum of the nominal value and the difference.

4. The method of claim 1, wherein the time parameter is a product of N×M and the nominal value, N is a number of adjustment periods experienced by the terminal device, and M is the adjustment factor.

5. The method of claim 1, wherein the adjustment period comprises a time period experienced by the terminal device and/or a moving distance period of the terminal device.

6. The method of claim 1, wherein the time parameter is a time parameter corresponding to the distance between the terminal device and the network device in the mapping.

7. The method of claim 1, wherein the time parameter is a product of the nominal value and a distance ratio, and the distance ratio is a ratio of the distance between the terminal device and the network device to the preset distance.

8. The method of claim 1, wherein the second information further comprises at least one of:
a round trip time (RTT);
a propagation delay;
a satellite ephemeris;
the distance between the terminal device and the network device; or
a moving trajectory of the terminal device relative to the network device.

9. A communication device, comprising:
a transceiver;
a memory configured to store computer programs; and
a processor configured to invoke and execute the computer programs stored in the memory, to cause the transceiver to:
receive a downlink (DL) message during random access in a time window, wherein the time window is determined according to first information and second information, the second information representing a distance between a terminal device and a network device, and the second information comprising a timing advance (TA);
wherein the first information comprises an adjustment parameter and the adjustment parameter is used for adjusting a nominal value of a time parameter of the time window, and wherein the time parameter comprising an offset of the time window, and the nominal value of the time parameter is a defined offset value;
wherein the adjustment parameter comprises at least one of:
a difference between the time parameter and the nominal value of the time parameter;
an adjustment step size used for periodic adjustment of the nominal value;
an adjustment factor used for periodic adjustment of the nominal value;
a mapping between distances and time parameters; or
a preset distance corresponding to the nominal value;
wherein the time parameter is a sum of the nominal value and N times the adjustment step size, and N is a number of adjustment periods experienced by the terminal device.

10. The communication device of claim 9, wherein the time parameter is a sum of the nominal value and the difference.

11. The communication device of claim 9, wherein the time parameter is a product of N×M and the nominal value, N is a number of adjustment periods experienced by the terminal device, and M is the adjustment factor.

12. The communication device of claim 9, wherein the adjustment period comprises a time period experienced by the terminal device and/or a moving distance period of the terminal device.

13. The communication device of claim 9, wherein the time parameter is a time parameter corresponding to the distance between the terminal device and the network device in the mapping, or the time parameter is a product of the nominal value and a distance ratio, and the distance ratio is a ratio of the distance between the terminal device and the network device to the preset distance.

14. The communication device of claim 9, wherein:
the time window is determined by the terminal device according to the first information and/or the second information when the terminal device has a positioning capability; or
the time window is determined by the terminal device according to the first information when the terminal device does not have a positioning capability.

15. The communication device of claim 9, wherein the distance between the terminal device and the network device comprises:
a distance between the terminal device and a satellite; or
a sum of the distance between the terminal device and the satellite and a distance between the satellite and a ground station.

16. A non-transitory computer readable storage medium configured to store computer programs which are operable with a computer to:

receive a downlink (DL) message during random access in a time window, wherein the time window is determined according to first information and second information, the second information representing a distance between a terminal device and a network device, the second information comprising a timing advance (TA);

wherein the first information comprises an adjustment parameter, and the adjustment parameter is used for adjusting a nominal value of a time parameter of the time window, and wherein the time parameter comprising an offset of the time window, and the nominal value of the time parameter is a defined offset value, wherein the adjustment parameter comprises at least one of:
- a difference between the time parameter and the nominal value of the time parameter;
- an adjustment step size used for periodic adjustment of the nominal value;
- an adjustment factor used for periodic adjustment of the nominal value;
- a mapping between distances and time parameters; or
- a preset distance corresponding to the nominal value;

wherein the time parameter is a sum of the nominal value and N times the adjustment step size, and N is a number of adjustment periods experienced by the terminal device.

* * * * *